Oct. 27, 1964   W. E. NEUBERT   3,154,040
SEA WATER BATTERY AUTOMATIC FLOW REGULATION VALVE
Filed July 6, 1962

INVENTOR.
WARREN E. NEUBERT
BY
ATTY.

United States Patent Office

3,154,040
Patented Oct. 27, 1964

3,154,040
SEA WATER BATTERY AUTOMATIC FLOW REGULATION VALVE
Warren E. Neubert, Pittsfield, Mass., assignor, by mesne assignments, to the United States of America as represented by the Secretary of the Navy
Filed July 6, 1962, Ser. No. 208,151
5 Claims. (Cl. 114—20)

The present invention relates generally to improvements in underwater missiles electrically propelled by the power derived from a sea water battery or the like and more particularly to a new and improved automatic flow regulation valve wherein in response to the velocity of the underwater missile the flow regulation valve automatically controls the electrical power output of the sea water battery by regulating the volume of sea water electrolyte flowing through the battery and thereby controlling the power available to the electrical propulsion system of the missile.

In the field of propelling underwater missiles such as torpedoes by electrical power derived from sea water batteries, it has been the general practice to employ a rather elaborate servo-mechanism system which controls the field energization of the driving electric motors and thereby compensates for the varying power output derived from a sea water battery. Although such devices have served the purpose, they have not proved entirely satisfactory under all conditions of service for the reason that such a system employs numerous electrical and mechanical parts as well as taking up considerable volume in a missile.

The general purpose of this invention is to provide a mechanism which is smaller in size, cheaper to manufacture, has fewer moving parts, and is of more simple and rugged construction which has the advantages of the prior art systems for electrical propulsion of an underwater missile in controlling the velocity of the missile by controlling the power output of the sea water battery by regulating the flow of electrolyte through the battery, while at the same time eliminating the disadvantage of having a large complex electromechanical system and replacing this with a simple mechanical automatic flow regulation valve.

This invention operates on the principle that the available power output of a battery is directly proportional to the temperature of the electrolyte within the battery and that by controlling the flow of electrolyte through the battery the temperature of the electrolyte can be held within limits and thereby obtain a more uniform and constant power output from the battery so that the speed of the missile may be maintained more constant.

An object of this invention is to control the flow of sea water electrolyte through a battery in a missile variably in accordance with the speed of the missile through the water.

Another object of the present invention is to control the power output of the sea water battery by maintaining a more constant temperature in the sea water electrolyte.

A further object of the present invention is to control the velocity of an electrically driven underwater missile by maintaining a more constant driving motor speed.

Still another object of the present invention is to provide a governor mechanism which in response to the velocity of the missile automatically regulates the flow of electrolyte through the battery.

A still further object of the present invention is to provide a flow regulation control of the sea water electrolyte so that a certain minimum flow is always present through the battery and to provide additional rate of flow to obtain the necessary velocity regulation.

With these and other objects in view, as will hereinafter more fully appear, and which will be more particularly pointed out in the appended claims, reference is now made to the following description taken in connection with the accompanying drawing in which:

Figure 1:
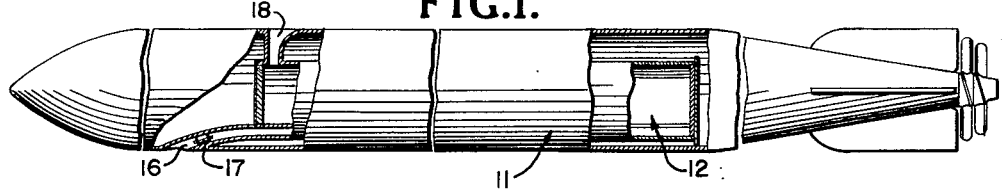
FIG. 1 is a side view, partially in section, of a preferred embodiment of the invention.

FIG. 1 is a view of an underwater electrically propelled missile which takes the form of a torpedo and which illustratively shows the relationship of the various parts of this invention. The torpedo generally shown at 11 has in the central portion the sea water batteries 12 which power the electrical propulsion system (not shown). The scoop 16 acts as an intake port for the sea water which is the electrolyte for the batteries 12 contained within the torpedo and directs this sea water through the flow regulation valve 17 and from thence through the sea water batteries 12 with an exhaust port at 18 so that the sea water returns to the sea after activating the batteries. The system of the scoop 16, the valve 17, sea water batteries 12 and the exhaust port 18 form a closed loop system for sea water electrolyte flowing through the torpedo and energizing the batteries 12.

Figure 2:
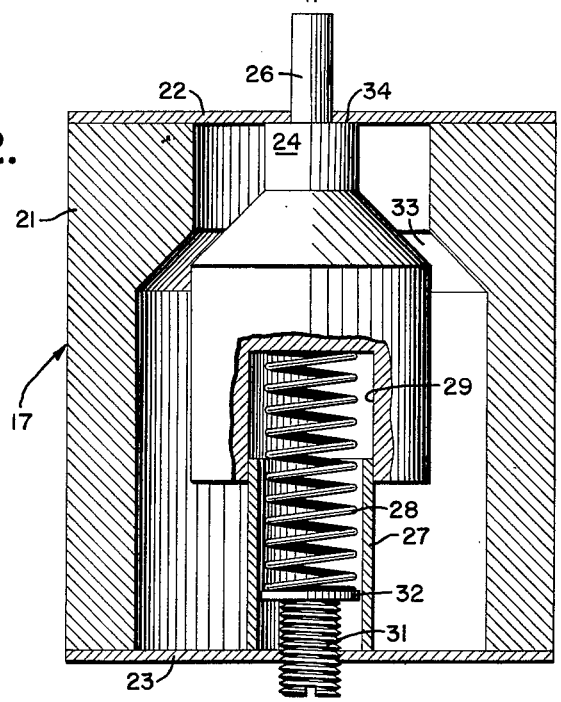
FIG. 2 is a greatly enlarged side view, partially in section, of the valve structure utilized to control the flow of sea water electrolyte.

FIG. 2 is a greatly enlarged side view, partially in section, of the flow regulation valve of FIG. 1. The main body portion 21 is placed within the closed loop system of the sea water flow system through the torpedo and acts as a supporting member for the remaining parts of the valve. A front plate 22 is attached to the main body portion 21 by suitable means such as screws (not shown) and in a similar manner the back plate 23 is attached to the main body portion 21 by suitable means such as screws as shown on FIG. 3. These two plates 22 and 23 are mounted in spaced relationship to each other and form a cavity which houses the flow regulating plug 24 which has a front guide 26 protruding and slideably engaged with the center of the front plate 22 and is also guided by the back plate guide 27 which is fixedly attached to the back plate 23 and protrudes within the flow regulating plug 24 so that the flow regulating plug 24 may freely slide back and forth directed by the two guides 27 and 26. The back plate guide 27 also acts as a stop for the movement of the flow regulating plug 24. Within the back plate guide 27 a coil spring 28 is placed and extends into the coil spring and guide recess 29 of the plug 24. An adjustable screw 31 operably engages the back plate 23 by means of suitable threads and maintains the washer 32 between the screw 31 and the coil spring 28. The purpose of the adjusting screw 31 is to maintain a proper bias on the flow regulating plug 24 so that the plug 24 is normally maintained in the position as shown. The shoulder 34 of the flow regulating plug 24 is a limit stop for the flow regulating plug 24 in the direction of the front plate 22 and with no sea water flowing through the valve the parts are in the position as shown in the figure. In this position a bypass 33 formed between the main body portion 21 and the flow regulating plug 24 is present and allows a certain minimum flow of sea water to bypass the flow regulating plug at all times when submerged in the water. This bypass 33 could be formed by other means not shown in the figure such as by inserting a conduit in the main body portion 21 or by drilling suitable holes through the flow regulating plug 24. The purpose, function and operation of this valve will be described more fully later.

Figure 3:
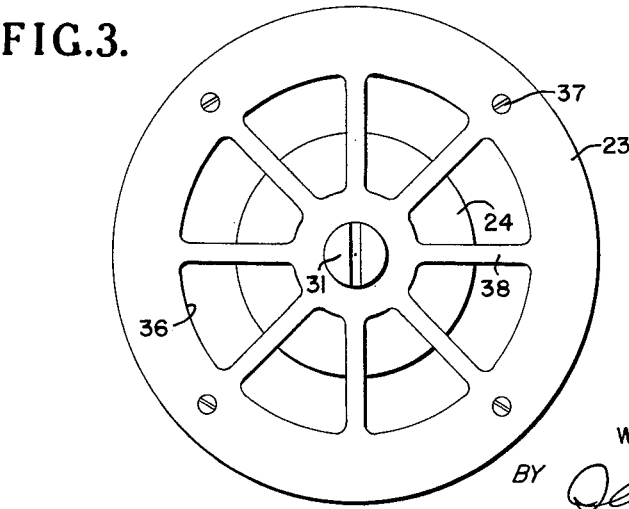
FIG. 3 is a bottom view of the apparatus shown in FIG. 2.

FIG. 3 is a bottom view of FIG. 2 showing the back plate 23, the adjusting screw 31, and a plurality of screws 37 which secure the back plate 23 to the main body portion 21, FIG. 2. The back plate 23 takes the appearance of a wheel with the adjusting screw 31 being the center hub and a plurality of spokes or ribs 38 extending from the center to the outer portion and defining a plurality of holes 36 formed by the plurality of ribs in the outer and center portions. The purpose of these holes is to allow the sea water to flow through the plate, the volume of sea water that can flow through these holes is a predetermined amount which will be explained more fully later.

Front plate 22 is of the same general configuration as the back plate 23 illustrated in FIG. 3 and provided with apertures such as 36 so that the effective area of the holes in the front plate 22 equals the effective area of the holes in the back plate 23.

The operation of the automatic flow regulation valve will now be described in connection with the combination of the torpedo having a sea water battery and electric propulsion system. Sea water batteries are small, compact and produce a high power output for a relatively short period of time and are well known in the art. A typical battery yields a power output of approximately 160 amperes at 110 volts for a period of five to ten minues and preferably has magnesium or magnesium alloy as its anode and silver chloride as its cathode and utilizes sea water as its electrolyte. The power output of a battery is dependent upon the temperature of the electrolyte which reacts with the anode and cathode to produce electrical energy and in general a battery produces a higher power output for a higher temperature electrolyte and a lower output if the temperature of the electrolyte be lower. In sea water batteries a certain minimum flow of sea water electrolyte is required in order to have a fresh supply of electrolyte between the anode and cathode as well as carrying away certain insoluble magnesium salts which result from the chemical reaction and, furthermore, the continuous circulation of the sea water prevents the battery from becoming overheated. A suitable temperature range of the sea water batteries is between 120–180 degrees Fahrenheit while the sea water is generally between 32–50 degrees Fahrenheit. Due to the high power output of the battery over a relatively short period of time much heat is produced thus requiring constant circulation. The power produced by the sea water battery is utilized in driving an electric motor which propels the torpedo by rotating the screws on the torpedo and the speed of the motor is dependent upon the power available at its input terminals. By controlling the temperature of the electrolyte within the sea water battery the power output of the battery can be controlled and thus the speed of the torpedo can be controlled by varying the power available output available from the battery. The valve of the present invention utilizes the principles of the invention described herein before and the bypass 33, FIG. 2, allows a sufficient volume of water to flow through the sea water battery by the closed conduit system of the torpedo described in reference to FIG. 1 such that the battery produces a high power output controlled by the heat of the electrolyte. The heating of the electrolyte at the high power output increases the speed or velocity of the torpedo which in turn increases the pressure on the flow regulating plug 24 due to the water trying to enter and flow through the torpedo. As the speed of the torpedo increases the pressure upon the flow regulating plug become sufficient to overcome the spring bias of the coil spring 28, FIG. 2, and causes the flow regulating plug to move from the front plate 22 toward the rear plate 23 and thereby allows a greater volume of water to flow through the valve and thereby cause a cooling of the electrolyte within the sea water battery and a subsequent reduction in the power output and thereby causing a reduction in the velocity of the torpedo. The bypass 33 is designed to allow only a sufficient amount of water to flow through the battery so that the torpedo would attain a velocity of 110% of its rated velocity and as the velocity of the torpedo increases and comes near rated velocity, the flow regulating valve moves toward the rear plate 23 to increase the rate of flow of the sea water through the battery and thus maintain the velocity of the torpedo nearly constant at the rated speed and over its entire path. The valve then acts as a governor for controlling the speed of the torpedo by controlling the flow of electrolyte through the sea water battery and it is possible to attain speed control within 2% of its desired value by controlling the flow of sea water electrolyte as is done in the present invention.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An underwater electrically propelled missile comprising a sea water battery for supplying electrical power to the missile, a closed loop sea water conduit system connected to said battery for directing sea water from the sea through the battery and then returning to the sea, a flow regulation control valve placed within said conduit system having a bypass for permittting a predetermined minimum flow of sea water through said valve, a moveable spring biased flow restricting means slideably connected to said valve and being positioned to receive dynamic forces imparted by the sea water flowing through said valve, whereby said flow restricting means is displaced by the dynamic forces to regulate between a predetermined maximum and said predetermined minimum the flow of sea water through said valve in direct proportion to the dynamic force exerted by said sea water on said flow restricting means.

2. A closed loop sea water battery flow control device for use in an electrically propelled torpedo comprising a torpedo, a sea water battery for supplying electrical power to propel said torpedo, a closed loop sea water conduit system connected to said battery for supplying a continuous circulation of sea water electrolyte through said battery, a flow regulation control means placed within said conduit system for automatically controlling the flow of sea water electrolyte through said closed loop between a predetermined minimum and maximum flow rate in response to the dynamic pressure exerted by said electrolyte upon said control means whereby the electrical power output of the sea water battery is varied in inverse proportion to the rate of flow of sea water electrolyte thereby varying the velocity of the torpedo in direct proportion to the electrical power output of the sea water battery.

3. An underwater electrically propelled missile comprising a sea water battery, a closed conduit system connected to said battery for conducting the sea water electrolyte through said sea water battery, a flow regulating valve within said conduit system having an inlet port and an outlet port arranged in spaced relationship to permit a predetermined maximum flow, a moveable flow inhibiting means positioned between said inlet and outlet ports, a flow bypass means to permit a predetermined minimum flow positioned between said inlet and outlet ports whereby said flow inhibiting means regulates between said minimum and maximum the rate of flow of the sea water in the conduit system in direct proportion to the dynamic force exerted on the moveable flow inhibiting means by the sea water flowing past the flow regulating valve.

4. A velocity control system comprising, in combination, an underwater electrically propelled missile, a sea water battery positioned within said missile and providing electrical energy for propelling the missile, a closed loop conduit system positioned within said missile for directing sea water from the sea through the battery and then returning to the sea, a sea water flow regulating valve positioned within said conduit system having means responsive to the dynamic pressure produced as a result of the velocity of the missile for automatically regulating the flow of sea water within said conduit system within a predetermined maximum and minimum rate of flow and thereby governing the velocity of the missile by controlling the electrical energy available from the sea water battery and used to propel the missile.

5. An underwater electrically propelled missile comprising a sea water battery positioned within said missile to provide electrical energy for propelling the missile, a closed loop sea water conduit system connected to said battery for directing the sea water from the sea through the battery and then returning to the sea, a valve positioned in said closed loop conduit for regulating the flow of sea water through the battery and hence regulating the energy generated by the battery, said valve comprising a main body portion having an axial bore extending therethrough to define an inlet port and an outlet port, the diameter of the inlet port being smaller than the diameter of the outlet port, said ports being joined by an intermediate tapered bore section, a flow impeding means positioned within said valve and being resiliently biased by an adjustable spring toward said inlet port, stop means formed on the valve body for preventing the flow impeding means from completely seating against the inlet port, whereby sea water flowing through said valve exerts a dynamic pressure upon said flow impeding means counter to the bias of said spring and thereby causes the flow impeding means to regulate the rate of flow of sea water through the battery in proportion to the dynamic pressure exerted upon said flow impeding means.

References Cited in the file of this patent

UNITED STATES PATENTS

| | | |
|---|---|---|
| 824,425 | Johnson | June 26, 1906 |
| 1,389,190 | Flint | Aug. 30, 1921 |
| 2,566,242 | Naymik | Aug. 28, 1951 |
| 2,568,340 | Jennings et al. | Sept. 18, 1951 |
| 2,663,313 | Doyle | Dec. 22, 1953 |
| 2,930,337 | Perrier et al. | Mar. 29, 1960 |
| 3,012,087 | Van Billiard et al. | Dec. 5, 1961 |
| 3,073,350 | Dillman | Jan. 15, 1963 |